United States Patent Office 2,886,578
Patented May 12, 1959

2,886,578
INACTIVATION OF CATALYST IN MOLECULAR REARRANGEMENT REACTIONS

George W. Holman and Victor Mills, Wyoming, Ohio, assignors to The Procter & Gamble Company, Cincinnati, Ohio, a corporation of Ohio No Drawing. Application July 11, 1955
Serial No. 521,422

15 Claims. (Cl. 260—410.7)

The present invention relates to an improved process for the inactivation of catalysts employed in reactions dealing with modification of the molecular structure of esters, and more particularly concerns a process for inactivating alkaline catalysts whereby loss due to saponification is reduced and useful yields of modified ester are increased.

It is known that alkali metals, anhydrous alkali metal hydroxides, and alkali metal alkoxides, for example, are especially active as catalysts in promoting molecular rearrangement in fatty esters, a reaction sometimes referred to broadly as "interesterification." In such reactions, substantial amounts of catalyst are known to react with free fatty acid or other constituents when added to the ester system, and the balance of the catalyst, with saponification potentialities after inactivation, appears to remain free and unreacted throughout the molecular rearrangement process.

It is also known that the alkaline interesterification catalysts can be inactivated by the addition of water or acid materials to the system. When water alone is added, aqueous hydroxide solutions result from combination with the catalyst. These solutions are capable of quickly saponifying neutral ester and actually do so to form undesirable soap even though measures may be taken to separate the hydroxide solution from the ester mixture as soon as inactivation is effected. On the other hand, if improperly controlled amounts of acid substance are added to inactivate the catalyst, the products initially formed when catalyst is brought into contact with ester are chemically decomposed to liberate free fatty acid. Such fatty acid must usually be removed before the rearranged ester can be utilized, thus necessitating a separate caustic refining step.

It is an object of the present invention to provide a process for the inactivation of alkaline molecular rearrangement catalysts with minimum equipment, minimum loss due to formation of soap, and minimum need for prompt separation of rearranged fat from the by-products resulting from inactivation.

A further object is to provide a continuous method for inactivating the catalyst in the molecular rearrangement of natural vegetable, animal, and marine glyceride oils and fats; and particularly lard.

How these and other objects of the invention can be realized will appear from the following description.

In accordance with the broad aspects of the present invention, carbon dioxide or other acid substance containing a polyvalent anion capable of producing salts which tend to preserve the hydrogen ion concentration of their aqueous solutions at a pH of about 9.5 to about 10.5 is employed in conjunction with water to inactivate the catalyst in the mixture of esters. The water is added simultaneously with or subsequent to the addition of acid substance to promote the inactivation and hydrate the by-products and otherwise aid in their separation from the rearranged ester.

Treatment of the alkaline interesterification catalysts in accordance with the present invention involves two reactions, the first, decomposition of the catalyst with formation of an aqueous solution of salts of the alkaline catalyst, and second, hydration of soaps and other products which have been formed during interesterification by action of the catalyst on fatty material. For example, in the inactivation of an alkali metal catalyst, the catalyst, is reacted with water and an appropriate acid or an acid substance, such as an acid salt to form alkali metal salts and hydrogen. When alkali metal alkoxides are employed, the water and acid substance causes catalysts decomposition with the formation of alkali metal salts and methyl alcohol. If anhydrous alkali metal hydroxide is used, then the water and acid substance form an aqueous alkali metal salt solution. In all instances, the second reaction involves the hydration of anhydrous soaps and any other alkali metal compounds formed by reaction of the catalyst with the ester during the rearrangement. The by-products of inactivation are thus rendered readily separable from the modified ester with the aqueous phase.

The tendency of salts to resist change in the hydrogen ion concentration of their aqueous solutions upon addition of an acid or base varies from salt to salt and we have accordingly found that it is preferable to exercise control over the amount of acid substance added even though the resistance may be as high as in the case of a true buffering salt. In general, when the acid substance added is an acid per se, the amount employed is not greater than the amount (by weight) of catalyst added but is sufficient to insure that the pH value of the aqueous phase, preferably immediately on inactivation of catalyst, will lie within the range of about 9.5 to about 10.5. When acid salts are employed, the weight may be greater than the weight of catalyst added but again the amount should be adjusted to give the stated pH in the aqueous phase. If the pH is substantially lower than 9.5 the resulting oil is undesirably high in free fatty acid content, and if the pH value is substantially higher than 10.5 the loss of rearranged oil is increased due to excess saponification. Thus, control of the pH within the stated range facilitates operation and materially reduces the need for immediate separation from the modified ester of by-products resulting from the catalyst inactivation.

Moreover, the amount of acid substance to add to achieve the proper pH value will depend on how much of the catalyst has combined with the ester during the interesterification reaction. We have found that in the use of about 0.25 percent (based on the ester) of a 50-50 sodium-potassium alkali metal alloy catalyst, for example, roughly one-half of the alkali metal alloy becomes combined in some way with the ester mixture being treated and that the remainder exists as free alkali metal alloy.

Based on the weight of free alkali metal alloy in the mixture, about one part by weight of carbon dioxide, for example, can be employed per one part by weight of free alkali metal alloy. This is in approximate agreement with the theoretical amounts of carbon dioxide and alkali metal alloy needed in a reaction producing a mixture of alkali metal carbonate and bicarbonate salts which tend to control the hydrogen ion concentration in the aqueous phase at a pH from about 9.5 to about 10.5.

The amount of alkali metal alloy catalyst which remains uncombined after interesterification has been completed will vary depending on the conditions of interesterification at hand, and consequently variations in the amount of carbon dioxide or other acid substance will be necessary to effect desired reaction with the free catalyst and the production of salts having the prescribed pH in the aqueous phase. In accordance with data obtained in practice of the present invention, the preferred weight of carbon dioxide will vary from about 0.7 part to about 1.3 parts per part of uncombined or free sodium-potassium alloy catalyst. If it is assumed that the amount of free or uncombined sodium-potassium alloy is roughly 50 percent of that added to the system, then the preferred amount of carbon dioxide based on alkali metal alloy added, will be from about 0.35 to about 0.65 part per part of alkali metal and adjusted, of course, to yield an aqueous phase having a pH from about 9.5 to about 10.5. Since, however, a mixture of carbonate and bicarbonate salts possesses particularly good buffering power, amounts of carbon dioxide in excess of .65 part per part of the catalyst can be employed without rendering the soap stock phase more acid than pH 9.5. Thus, amounts of carbon dioxide, equal to the weight of alloy catalyst can be employed.

Equivalent variations in carbon dioxide usage are permissible when the catalyst is an alkali metal alkoxide or anhydrous sodium hydroxide, for example, but the amount of acid substance for inactivation will, of course, vary with the amount of active catalyst present, stoichiometric considerations being borne in mind.

Also, variations in the actual amount of acid substance, primarily deduced on the basis of chemical equivalence, may be necessary when acid phosphates (e.g. monosodium dihydrogen phosphate), acid carbonates (e.g. sodium bicarbonate), citric acid, phosphoric acid, boric acid or other suitable acid substances are employed to effect neutralization and produce salts which tend to resist change in hydrogen ion concentration. In all instances, however, it is highly advantageous to use at least one acid substance in that amount which will form an aqueous phase which preferably exhibits a pH value within the range of about 9.5 to about 10.5 substantially immediately on inactivation.

In the practice of the invention we have found that the loss of modified ester decreases rapidly with increase in the ratio of the weight of water to the weight of catalyst, the loss reaching a minimum at a water:catalyst ratio of about 9:1 when the catalyst is a 50–50 sodium potassium alloy. This water:catalyst ratio can be varied on either side of the optimum ratio without seriously increasing the loss of modified ester, but we prefer to adjust it within the range of 7:1 to 12:1. Too much water will, of course, result in modified ester having an undesirable high moisture content, and too little water will result in a granular soap stock which occludes modified ester and which, by conventional practical means, does not separate cleanly therefrom.

Obviously the desirable water:catalyst ratio may change with change in the type of catalyst employed. Thus, when equal molar quantities of sodium methoxide or anhydrous sodium hydroxide are respectively substituted for the sodium-potassium alloy, the preferred water:catalyst ratio will vary from about 4:1 to about 6:1 when the methoxide is employed, and from about 5:1 to about 8:1 when anhydrous sodium hydroxide is employed.

Experimentation has indicated that when the acid substance and water are added separately, as may be the case when liquid or gaseous acid inactivating substances are employed, it is advantageous to incorporate the substance in the catalyst containing system prior to the introduction of water. Such an arrangement enables the accurate control of the introduction of inactivating constitutents so that the proper alkalinity envrionment is produced prior to the addition of water, which, if added first, would produce an aqueous solution so alkaline as to be capable of converting at least some of the fatty ester into soap. On the other hand, the ingredients can be added simultaneously and preferably at the same point in the system. Aqueous solutions of the acid substance, in appropriate concentration, can also be employed, for example, when the acid substance is a salt in solid form.

In continuous operations, introduction of water and acid substance separately or in the form of solutions is advantageously conducted by means of appropriate proportioning apparatus and thorough mixing of the resulting combination of ingredients is effected as promptly as possible to avoid formation of strong alkali solutions by combination of water with the catalyst.

Separation of the modified ester from the aqueous phase containing by-products of the inactivation (soap stock and salts) is preferably conducted as promptly as possible after thorough incorporation of the inactivating agent, and can advantageously be assisted by adjusting the mix to a temperature at which the soap stock tends to coagulate into a fluid mass with the aqueous phase which is then readily separable, either by gravity or centrifugal separation. Temperatures within the range of about 120° F. to about 150° are conventionally employed for such separations, preferred temperatures being of the order of 140° F. Also, additional electrolytes such as sodium chloride can be used in small amount to facilitate sharp separation of the phases.

When the invention is employed in catalyst inactivation following directed interesterification in which solid esters are formed, it is essential that the temperature of separation be adjusted so that all fatty components are liquid.

When the catalyst employed is an alkali metal catalyst, then the reaction of the catalyst with water, as indicated above liberates hydrogen gas, and positive separation of this gas by a degasification procedure is advisable, not only to reduce entrainment of the gas in the soap stock, which causes the soap stock to float on the surface of the oil, but also to eliminate the hazard of hydrogen gas in the separating area. If the separation of soap stock from the modified ester is effected by gravity separation, then a positively controlled degasification step is of great advantage. Continuous processes of operation involving separation of the soap stock from modified ester by means of centrifuges reduces the need for a positively controlled degasification step, but the hazard of hydrogen gas in the centrifuge area would then exist.

In the preferred procedure for degasification the mixture of modified ester and by-products of catalyst inactivation are flashed into a chamber in which a subatmospheric pressure is maintained. Preferably the temperature of the mixture at the time of introduction is from about 140° to about 160° F. and the absolute pressure in the chamber is maintained within the range of about 10 to about 15 inches of mercury so as to avoid excessive removal of moisture from the soap stock, thereby enabling adequate flow from the centrifuge.

Summarizing, the basic and essential steps of the process herein covered are as follows:

(1) Add the acid substance to the rearranged fat and subsequently or simultaneously add an appropriate amount of water, the amount of acid substance being chosen to insure the production of a water-salt-soap phase having a pH value from about 9.5 to about 10.5.

(2) Mix the combined ingredients to obtain thorough distribution of the acid substance and water throughout the systems.

(3) (Optional) Degasify to remove objectionable gases contained in the mixture.

(4) Adjust the fat-water-salt-soap mixture to a temperature which is sufficient to facilitate separation of the soap from the neutral oil, usually 120–150° F.

(5) Separate the precipitated soap stock from the rearranged neutral oil.

The process is preferably a continuous one in which the acid substance and water are continuously added to the rearranged fat, following which the mixture is sequentially agitated, heated, degasified (if necessary) and subjected to centrifugal separation in a continuous manner. It is also possible to inactivate the catalyst continuously or batch-wise, followed by batch-wise separation of the soap stock in either case.

The following specific examples will illustrate the manner in which the invention may be practiced, but it is to be understood that the invention is not limited to the precise conditions of operation set forth.

*Example 1.*—400 pounds of crude lard were dried under vacuum and then subjected to batch interesterification in the liquid phase at 105° F. with one pound (0.25%) of an alkali metal catalyst comprising essentially an alloy of approximately 50% sodium and 50% potassium.

Following completion of the rearrangement reaction, the modified lard, at a temperature of 105° F. and at a rate of 103 pounds per hour, was continuously pumped through pipe lines leading to a high speed mechanical mixing device. Into the stream of modified lard approaching the mixer was introduced gaseous carbon dioxide at a rate equal to about .43 part by weight of carbon dioxide per part of alloy in the flowing stream. Through a separate inlet T downstream of the carbon dioxide injection station, water, at room temperature and containing ½% sodium chloride (soap stock conditioner), was injected at the rate of about 7.8 parts by weight per part of alloy in the flowing stream. The resulting mixture then passed continuously through the mechanical mixer which provided an average residence time of about six seconds and which thoroughly distributed the water and carbon dioxide throughout the lard mixture, thus enabling reaction with and inactivation of the sodium-potassium alloy catalyst.

From the mixer, the lard and by-products of the catalyst inactivation were continuously passed to an open "hold" tank which provided an average residence time of ten minutes and in which the contents were gently agitated to prevent gravity separation of soap stock. This was intended to simulate a ten minute pipe line residence time in plant operations. From the "hold" tank the mixture was continuously pumped through a heat exchanger to raise the temperature to about 140° F. and then discharged into a centrifugal separator which separated the modified lard from the aqueous phase containing soap stock and other products of inactivation. The pH value of this phase was approximately 10.2.

At the completion of centrifuging, a loss determination was made and it was found that approximately 2% (average of two determinations) of the original crude lard had been lost in the operation.

A similar batch of the same rearranged lard was treated in exactly the same manner except that no carbon dioxide was employed and in this instance the loss (average of 2 runs) was 4.3%. The pH value of the aqueous phase in this instance, on delivery to the "hold" tank was about 12, whereas the pH of the aqueous phase discharged from the centrifugal was about 9.8, the reduction in pH resulting from consumption of alkali by way of saponification of ester.

The process of this example is equally applicable to the inactivation of the catalyst in modified lard in which 0.45% of sodium methoxide is used.

*Example 2.*—In a run similar to that of Example 1, a 5% solution of sodium bicarbonate was used to inactivate the catalyst. This provided .42 part by weight of sodium bicarbonate and about 8 parts by weight of water per part of sodium-potassium alloy added. The loss of modified ester was approximately 3%. The pH value of the soap stock phase in this run was about 10.3.

*Example 3.*—In this run the lard was rearranged with the aid of .25% sodium-potassium alloy catalyst under temperature conditions that favored the simultaneous crystallization of high melting triglycerides. The final temperature of rearrangement was about 85° F. The inactivation embodied the introduction of .76 part by weight of carbon dioxide per part of sodium-potassium alloy and approximately 9 parts by weight of ½% sodium chloride solution into the modified lard slurry at about 85° F. The treatment was continuous, the mixture flowing through a mechanical mixer which provided a residence time of about 2 minutes and wherein adequate dispersion of the water and carbon dioxide throughout the modified lard was effected. The mixture was then heated to approximately 160° F. and passed through a degasifier in which the absolute pressure was equal to about 15 inches of mercury. Thereafter the degasified mixture was continuously passed through a "hold" tank which provided an average residence time of 10 minutes. The mixture was then subjected to centrifugation at 140° F. The loss of modified ester was 1.4%, the pH of the soap stock phase being 9.75.

In a similar run on the same modified lard in which no carbon dioxide was employed, the inactivation being effected by the use of water alone, the pH of the aqueous phase discharged at the centrifuge was about 10.8 and the loss was 3.9%.

A reduction in loss of modified ester can also be effected by employing in a similar process an 8.2% solution of phosphoric acid in such amount to yield about 0.8 part by weight of phosphoric acid (and about 9 parts by weight of water) per part by weight of sodium-potassium alloy added. The pH of the foots phase will be of the order of 10.

Inactivation of catalyst can also be successfully accomplished with realization in loss savings of modified ester by the use of a 10% aqueous solution of monosodium dihydrogen phosphates in amount sufficient to provide about 1.0 part by weight of $NaH_2PO_4$ (and about 9 parts by weight of water) per part of sodium-potassium alloy added.

The temperature at which the acid substance and water are added to the system is not critical, but when the process is applied to esters which have been rearranged under conditions having an influence on the nature of the end product, e.g., at temperatures sufficiently low to permit rearrangement with simultaneous crystallization, it is preferably conducted at the final temperature of rearrangement so as to avoid undesirable changes in composition of the glycerides before the catalyst is fully inactivated.

The time of agitating the mixture after addition of the inactivating constituents is not critical, but there is no substantial benefit obtained by extending the agitation beyond the point at which thorough mixing is achieved. The intensity of the agitation is not critical.

Mixing of the acid substance and water with the modified ester to effect inactivation of catalyst can be conducted in ways well known in the art. Mechanical mixers available in the industry may be employed without departing from the spirit of the invention. It is important, however, that the choice of a mixer be such that adequate distribution of acid material throughout all portions of the modified ester is effected promptly and efficiently.

The process of the present invention is most advantageously used in conjunction with continuous interesterification processes as disclosed, for example, in Holman et al. application Serial No. 426,134, filed April 28, 1954, now U.S. Patent 2,738,278, and Hawley et al. application Serial No. 453,971, filed September 2, 1954, now U.S. Patent 2,733,251. Adaptation of the usual continuous mixing procedures and continuous centrifugal procedures for separating by-products of inactivation from modified ester are readily achieved.

While the above examples are directed to the inactivation of catalysts employed in the modification of lard, an important commercial utility, it is to be understood that the invention is equally applicable to all molecular rearrangement reactions including ester-ester and alcohol-ester reactions in which alkaline catalysts are employed. Included are those reactions conducted wholly in the liquid phase and those directed rearrangement reactions described in U.S. Patents 2,442,531 and 2,442,532, issued June 1, 1948, in the name of Eddy W. Eckey.

Having thus described our invention, we claim:

1. In the molecular rearrangement of fatty esters with an alkaline reacting molecular rearrangement catalyst, the steps of inactivating the catalyst with minimum ester saponification and fatty acid development which comprise: adding to the ester-catalyst system water and an acid substance which is capable of (1) forming a polyvalent anion in the presence of water and of (2) reacting with the more alkaline catalyst in the presence of said water to produce a mixture of salts which tends to preserve the hydrogen ion concentration of the aqueous phase at a pH value from about 9.5 to about 10.5, and admixing the combined components to inactivate the catalyst and produce said mixture of salts and said aqueous phase having a pH within said range.

2. The process of claim 1 in which the acid substance is added prior to the addition of the water.

3. The process of claim 1 in which the acid substance and water are added simultaneously.

4. In the interesterification of glyceride mixtures with alkali metal as a catalyst, the process of inactivating the catalyst which comprises, adding to the system, water in amount by weight not substantially more than 12 times the weight of the catalyst employed and at least one acid substance chosen from the group consisting of carbon dioxide, sodium bicarbonate, phosphoric acid, and sodium dihydrogen phosphate in amount by weight not substantially greater than the weight of catalyst employed, the amounts of water and acid substance being sufficient to inactivate said catalyst and produce an aqueous phase containing a mixture of salts and having a pH within the range of about 9.5 to 10.5, and agitating the mixture to inactivate the catalyst and form said aqueous phase.

5. The process of claim 4 in which the acid substance is carbon dioxide.

6. The process of claim 4 in which the acid substance is sodium bicarbonate.

7. The process of claim 4 in which the acid substance is phosphoric acid.

8. The process of claim 4 in which the acid substance is sodium dihydrogen phosphate.

9. The process of claim 10 in which the weight of carbon dioxide added is from about 0.35 to about 1.0 times the weight of catalyst employed and in which the weight of water is from about 7 to about 12 times the weight of the catalyst employed.

10. In the interesterification of glyceride mixtures with a sodium-potassium alloy catalyst, the process of inactivating the catalyst and recovering the glyceride produced which comprises the steps of adding to the system an amount of carbon dioxide not substantially greater in weight than the weight of the catalyst employed, and an amount of water not substantially greater in weight than 12 times the weight of the catalyst employed, the amounts being sufficient to react with catalyst in the presence of said water and produce an aqueous phase which contains a mixture of carbonate and bicarbonate salts and which has a pH value from about 9.5 to about 10.5, admixing the combined components to inactivate the catalyst and form said aqueous phase, and separating the glyceride from the aqueous phase.

11. In the molecular rearrangement of fatty esters with an alkaline reacting molecular rearrangement catalyst, the steps of terminating the reaction and recovering rearranged esters which comprise: adding to the system water and an acid substance which is capable of (1) forming a polyvalent anion in the presence of water and of (2) reacting with the more alkaline catalyst in the presence of said water to produce a mixture of salts which tends to preserve the hydrogen ion concentration of the aqueous phase at a pH value from about 9.5 to about 10.5, agitating the mixture to distribute the acid substance and water throughout the system and thereby inactivate the catalyst and produce said mixture of salts and said aqueous phase, adjusting the temperature of the system to a range within which all fatty components are liquid, and separating the aqueous and fatty ester phases.

12. In the process of modifying the molecular structure of lard with the aid of an alkaline reacting interesterfication catalyst, the steps which comprise continuously passing the reaction mixture containing catalyst and products of the side reaction of catalyst and lard into a mixing zone; adding carbon dioxide and water to the flowing stream of reaction mixture, the amounts of carbon dioxide and water being sufficient to enable the reaction of the carbon dioxide with catalyst in the presence of said water to form an aqueous phase which contains a mixture of carbonate and bicarbonate salts and which has a pH value of from about 9.5 to about 10.5; vigorously agitating the mixture to inactivate the catalyst, hydrate side reaction products, and produce said aqueous phase, continuously passing the agitated mixture to a heating zone and heating same to a temperature in the range of 120° to 150° F. and sufficient to liquefy the modified lard and promote coagulation of side reaction products; and subsequently separating the hydrated side reaction products and the aqueous phase containing products of catalyst inactivation from the modified lard.

13. The process of claim 12 in which the carbon dioxide is added to the flowing stream prior to the addition of water.

14. The process of claim 12 in which the carbon dioxide and water are added to the flowing stream simultaneously at the same point.

15. The process of claim 12 in which the catalyst is a sodium-potassium alloy and in which free gases formed by reaction of the catalyst with the water are removed from the mixture prior to separation of the aqueous and organic phases.

References Cited in the file of this patent

UNITED STATES PATENTS

| | | |
|---|---|---|
| 2,383,581 | Arrowsmith et al. | Aug. 28, 1945 |
| 2,442,535 | Eckey | June 1, 1948 |
| 2,442,538 | Abbott | June 1, 1948 |
| 2,726,158 | Cochran et al. | Dec. 6, 1955 |